Patented Feb. 13, 1951

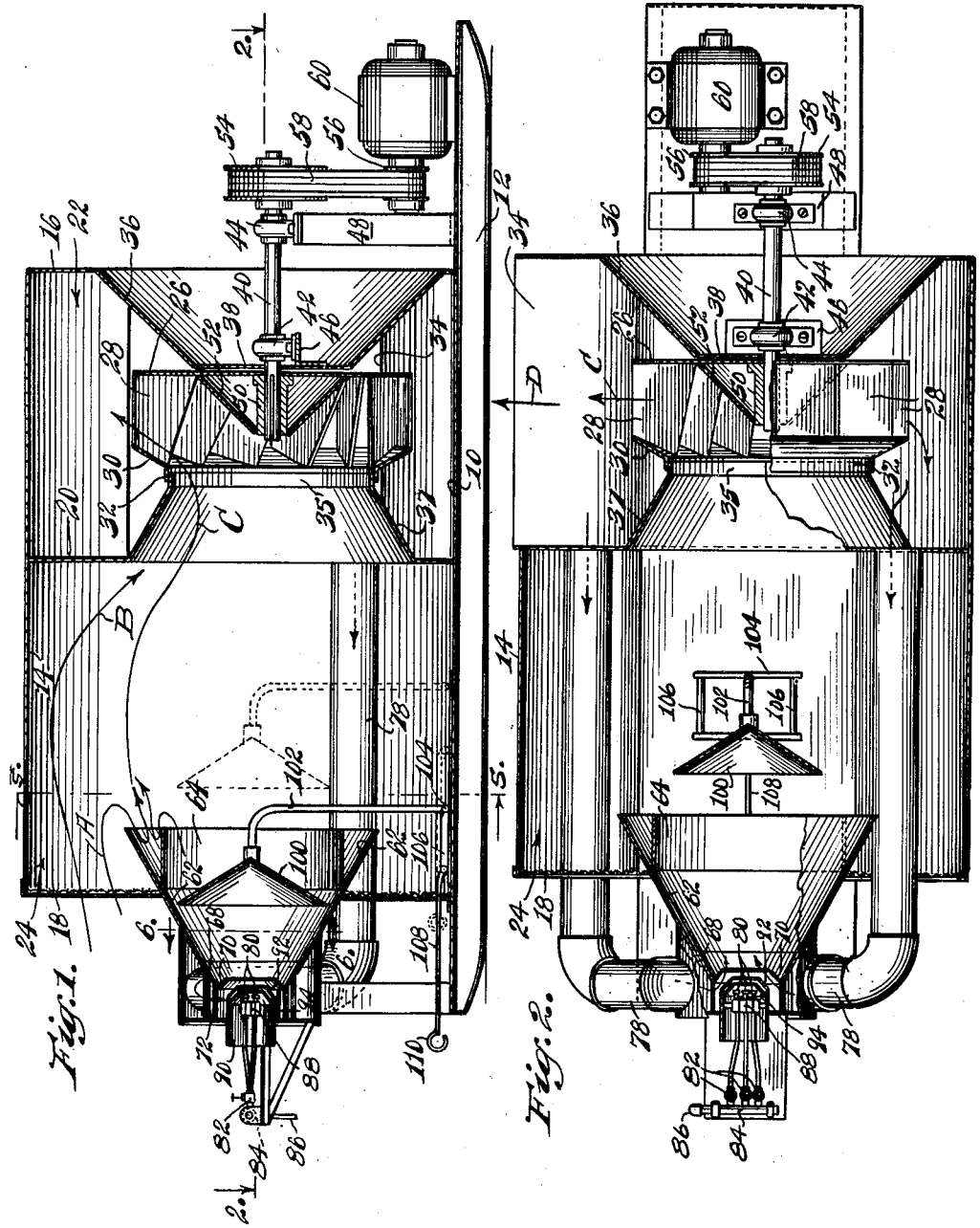

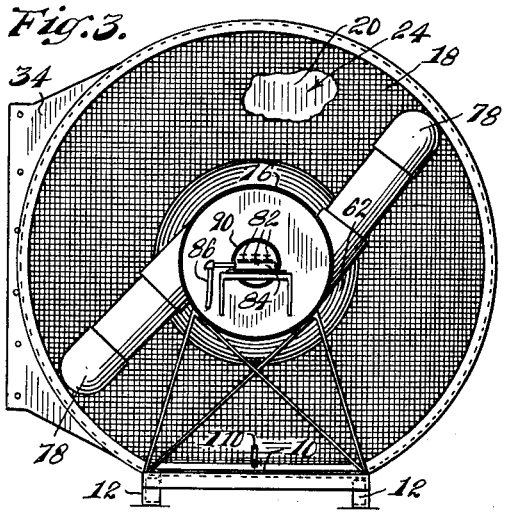
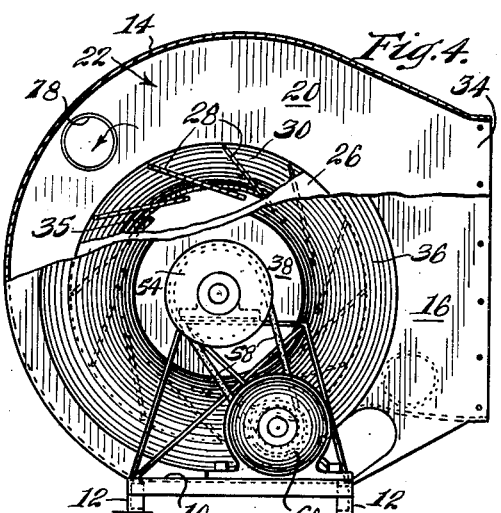
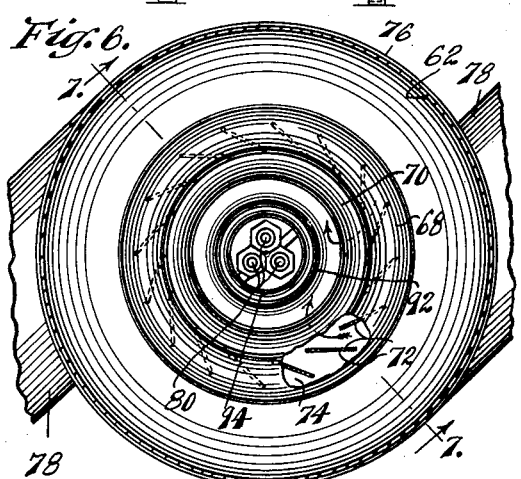
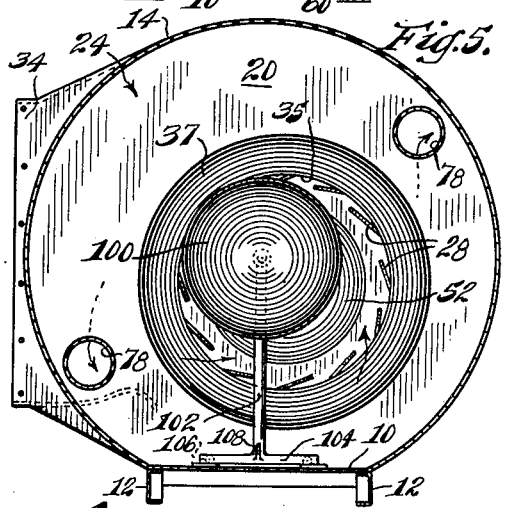
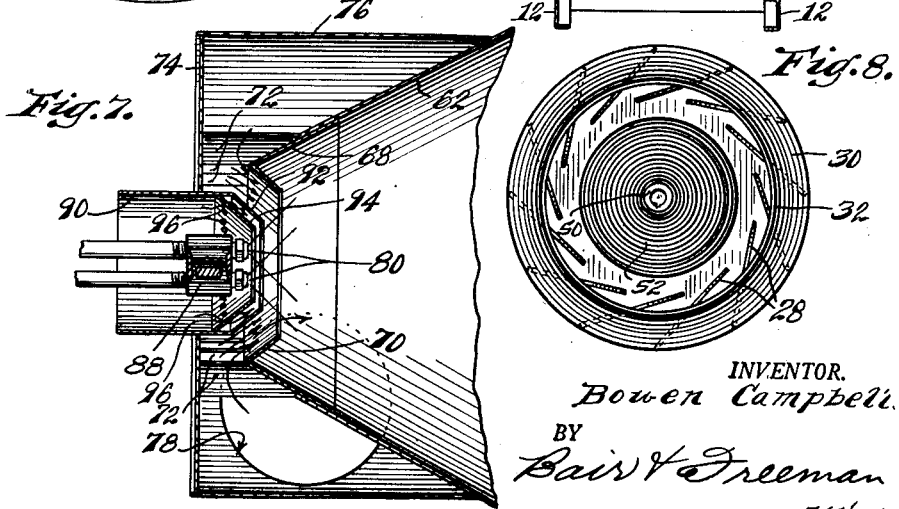

2,541,332

UNITED STATES PATENT OFFICE 2,541,332

PORTABLE DRIER

Bowen Campbell, Des Moines, Iowa

Application November 5, 1947, Serial No. 784,153

9 Claims. (Cl. 263—19)

This invention relates to a portable dryer for use about the farm for the purpose of drying grain, hay, tobacco, etc. or any commodity that requires a blast of heated air to effect the drying operation.

One object of the invention is to provide a dryer in the form of a unit including an oil burning combustion chamber and a blower mounted on skids or the like for portability, the blower being adapted to discharge heated air into a corn crib or other structure for drying the grain or any commodity stored therein.

Another object is to provide a dryer which is compact and requires a minimum of operating parts, a single blower being provided for both forcing air to the combustion chamber and discharging heated air from the dryer to any desired point where the air is to be used.

Still another object is to provide a dryer wherein a cone-shaped combustion chamber is provided for maximum efficiency for either a high flame or a low flame and is contained in an intake housing for a blower, the blower itself having a housing provided with a discharge portion for discharging heated air to the building or other structure in which the air is to be used for drying grain and the like is forced.

A further object is to provide outlets from the blower housing and leading to the combustion chamber for supplying the oxygen necessary to support combustion therein, the arrangement being such that substantially complete combustion is had under all conditions of adjustment and the apparatus being capable of supplying heated air for drying purposes in either small or large volume as desired.

Still a further object is to provide a combustion chamber into which a plurality of oil atomizing nozzles discharge so that one or more of the nozzles may be used as desired or required, a cone shaped combustion chamber being provided to substantially fit the flame regardless of the number of nozzles used and a baffle disc arrangement being provided in conjunction with the combustion chamber for facilitating the adjustment of the chamber for most efficient operation for all sizes of flames.

An additional object is to provide a blower housing with an intake housing thereadjacent and receiving air to deliver to a blower in the blower housing, the air being received in the intake chamber around the periphery of a cone-shaped combustion chamber therein so that the air mixes with heated gases from the combustion chamber in an effective manner for substantially uniform heating throughout the volume of air discharged from the blower housing.

With these and other objects in view, my invention consists in the construction, arrangement and combination of the various parts of my portable dryer whereby the objects contemplated are attained, as hereinafter more fully set forth, pointed out in my claims and illustrated in the accompanying drawings, wherein:

Figure 1 is a vertical sectional view through a portable dryer embodying my invention.

Figure 2 is a horizontal sectional view thereof as taken on the line 2—2 of Figure 1.

Figure 3 is an end view of the left hand end of Figure 1.

Figure 4 is a similar end view of the right hand end of Figure 1, a portion of the blower housing being broken away to illustrate parts in section and internal details.

Figure 5 is a vertical sectional view on the line 5—5 of Figure 1 showing a baffle cone arrangement in relation to the combustion chamber and intake housing for the blower.

Figure 6 is an enlarged sectional view on the line 6—6 of Figure 1, showing the intake of air to the combustion chamber.

Figure 7 is a sectional view on the line 7—7 of Figure 6 showing further details of the combustion chamber and burner arrangement, and Figure 8 is an end view of the blower rotor looking toward the right in Figure 1.

On the accompanying drawings I have used the reference numeral 10 to indicate a base plate formed of sheet metal or the like and supported on skids 12. Extending up from the base plate 10 is a cylindrical housing 14 having ends 16 and 18 and a partition 20. The elements 16 and 20 are of sheet metal and the element 18 is formed of perforated material such as one-quarter inch hardware cloth.

The elements 14, 16 and 20 form a blower housing and the elements 14, 18 and 20 cooperate to form a blower intake housing. The spaces in the respective housings are indicated as a blower housing space 22 and a blower intake housing space 24 for convenience in reference thereto in the following description.

Within the blower housing 22, a blower is provided in the form of a disc 26 having inclined blades 28 projecting from one face thereof and tied together by means of a cone section 30 terminating in a cylindrical ring 32. The ring 32 surrounds a ring 35 which is part of a cone 37, the cone 37 in turn defining an intake opening for the blower in the partition 20. Thus air may enter through the screen 18 as indicated by the arrow A in Figure 1 and flow as indicated by the arrows B and C through the blower intake housing 24 and into the blower housing 22. The air is then discharged as indicated by the arrow D from an open side of the housing 22 which side forms an outlet indicated at 34 in Figures 2, 4 and 5.

The wall 16 includes a cone-shaped portion 36 terminating in a wall 38 through which the blower shaft 40 extends. This shaft is journalled in bearings 42 and 44 supported on a cross bar 46 and a bracket 48, respectively. The inner end of the shaft is keyed to a hub 50 secured to the blower disc 26 and reinforced by a center cone 52.

The shaft may be driven by means of pulleys 54 and 56 and a plurality of V belts 58. The pulley 56 is secured to the shaft of a motor 60.

Within the blower intake housing 24 I provide a cone-shaped combustion chamber 62 and an annular ring-shaped portion 64, the purpose of which will hereinafter appear. The entire assembly is welded together for rigid connection of the parts with each other. The outer end of the combustion chamber 62 is provided with a cone-shaped extension 68 terminating in a reversed cone 7. The extension 68 is connected by a plurality of air turning vanes 72 with a disc 74 which in turn has a cylinder 76 connected with its periphery and with the cone 62, connection of the parts together being by welding.

The elements 74 and 76 constitute an air receiving chamber which receives air from a pair of conduits 78 entering the chamber tangentially after extending from the partition 20 and through the screen 18. Air is thus forced from the pressure side of blower housing 22 through the conduits 78 into the chamber 74—76. This air then flows through the turning vanes 72 which in addition to the tangential arrangement of the conduits 78 produce a fast whirling action of the air for thorough mixture of the air with atomized fuel such as oil or the like. The oil just referred to is sprayed into the cone 62 by means of spray nozzles 80 connected by valves 82 to a manifold 84. An oil supply pipe 86 connects with the manifold 84 and supplies oil under pressure thereto.

The nozzles 80 are supported by a head 88 inside a nozzle hood comprising a cylindrical element 90 and a pair of cone elements 92 and 94. The element 94 is provided with openings 96, and primary air for supporting combustion flows into the cylinder 90 through the cones 92 and 94 and through the openings 96 to mix with the atomized oil from the nozzles 80. The cones 92 and 94 deflect this air inwardly to cause better mixing and this air together with the atomized oil is then mixed by the whirling air deflected inwardly by the cone 70 and whirled by the vanes 72. The final result is excellent combustion within the combustion cone 62.

The combustion chamber 62 being cone shaped has a tendency to fit the flame regardless of its size. A baffle 100 is provided which is preferably cone-shaped and formed of stainless steel to withstand the heat of the flame. The baffle 100 is supported by a post 102 having a cross member 104 at its lower end, the purpose of which is to guide the baffle and support it in the desired position. Cooperating in the support of the post is a rod 106 with which is connected a control rod 108 terminating in an eye 110 serving as a handle for the purpose of sliding the cone 100 between the positions shown in Figures 1 and 2. For a small flame the baffle disc 100 works best when adjusted as to the position of Figure 1 whereas for a larger flame adjustment to the position of Figure 2 is more efficient. The baffle 100 need not necessarily be cone-shaped as it will perform its function if flat though possibly not as efficiently.

The nozzles 80 may have different capacities and may be supplied with oil in various combinations to secure different sized flames. By way of example three nozzles may be used having capacities of 2, 3 and 4 gallons per hour. Thus singly and in combination, 2, 3, 4, 5, 6, 7 and 9 G. P. H. may be secured. Instead of the valves 82, solenoid valves may be used and thermostatically controlled if automatic operation is desired.

*Practical operation*

In the operation of my portable dryer, the apparatus may be dragged by means of horses or a tractor to the desired position in respect to a corn crib or the like and the outlet 34 either positioned against the corn crib to register with an opening thereof or a suitable conduit may connect the dryer to the crib. Such a conduit for instance may be made of canvas or the like.

One of the nozzles is supplied with oil after the motor 60 is energized to supply the necessary oxygen to support combustion and other nozzles may be ignited from the first one if desired. The cone 100 is adjusted for the size flame produced which of course depends on the temperature required for the particular drying job to be done. Fresh air is drawn in as indicated by the arrow A through the screen 18 and mixes with the products of combustion from the combustion cone 62 before entering the cone 37 and the blower.

The annular ring 64 causes the flame to travel as indicated by the arrows E to mix with the secondary air indicated by the arrow A. This breaks up the stream-line flow of the combustion gases and causes them to curl around the edge of the annular ring as indicated by the arrow E with the secondary air curling around the edge of the combustion chamber as indicated by the arrow A to thoroughly intermix with the combustion gases. If the gases and the air were permitted to maintain a stream-line passage through the dryer they might not get mixed before cooling below their combustion temperature. The mixed air and combustion gases then flow through the blower as indicated by the arrows C and are discharged at D.

The heated air is discharged into the corn crib or other structure where the material to be dried is stored and the drying operation is continued as long as desired. The degree of heat can be changed as drying progresses by altering the number of nozzles if that is desirable or necessary.

The portable dryer disclosed is relatively compact by having a single blower supply combustion air as well as discharge heated air for drying purposes. By having the combustion chamber contained in an intake chamber into which fresh air enters, an efficient mixing action is had and the entire structure is enclosed as a unit in a relatively small cylindrical casing. The resulting structure is readily portable and can be quickly hooked up with various buildings or other structures designed to receive heated air for drying grain or the like stored therein.

The device is universal in its use for drying purposes and adjustable over a wide range of temperatures to suit the various commodities likely to be found about a farm or the like, which require drying to properly condition them for storage or use. The apparatus is easily fabricated, mostly from sheet metal on circular shears, the design of the blower housing being such as to permit of a circular outline yet increasing volume of housing space about the blower wheel as the discharge opening is approached. This is accomplished by setting the blower wheel off-center in the blower housing.

In respect to efficient combustion it will be noted that the housing 76 receiving primary air for combustion surrounds the combustion chamber 62 and therefore receives heat from the combustion chamber to preheat the air before it mixes with the flame. This feature aids in the efficient combustion of the fuel mixture.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a dryer of the character disclosed, a housing, a partition in said housing dividing it into a blower housing and a blower intake housing having an open end, a blower in said blower housing having an intake opening and a constricting cone leading thereto, an outlet therefrom for supplying heated air, a cone shaped combustion chamber having its large end projecting into said blower intake housing, said combustion chamber having a smaller diameter than said intake housing whereby air may enter the open end of said intake housing around the combustion chamber and mix with the products of combustion therefrom within said intake housing before entering said blower, such air being deflected outwardly by said cone-shaped combustion chamber and returned inwardly to enter said constricting cone, atomizing nozzles for fuel adjacent the small end of said combustion chamber and discharging thereinto, means for supplying auxiliary combustion air to said nozzles comprising conduits leading from said blower housing and through said blower intake housing, and turning vanes for whirling the air from said means before it reaches said nozzles.

2. In a portable dryer, a housing open at one end, a partition in said housing dividing it into a blower housing and a blower intake housing, a blower in said blower housing, a heated air outlet therefrom, a cone-shaped combustion chamber projecting into said blower intake housing, said combustion chamber being smaller in diameter than said intake housing whereby air may enter said open end of said housing around said combustion chamber, a fuel nozzle for said combustion chamber and a baffle in said combustion chamber adjustable toward and away from said nozzle, said combustion chamber having a cylindrical portion therein to deflect the flame toward the center and permit it to expand when leaving said combustion chamber and mix with air entering said intake housing, said baffle comprising a cone shaped element with its apex opposite the apex of said cone-shaped combustion chamber and having a diameter somewhat smaller than said cylindrical portion so that the baffle may be adjusted to a position therein with space around the baffle for flow of the gases of combustion.

3. In a portable dryer, a housing open at one end, a partition in said housing dividing it into a blower housing and a blower intake housing, a blower in said blower housing, an outlet therefrom, a cone-shaped combustion chamber projecting into said blower intake housing, said combustion chamber being smaller than said intake housing whereby air may enter said intake housing around the combustion chamber, atomizing nozzles for fuel adjacent the small end of said combustion chamber and discharging thereinto, means for supplying combustion air to said nozzle comprising conduits leading from said blower housing, and a disk-like baffle in said combustion chamber and arranged laterally of the axis thereof.

4. In a dryer of the character disclosed, a housing, a partition therein, a blower on one side of said partition and a cone-shaped combustion chamber on the other side of said partition, said blower receiving air from around said combustion chamber and receiving the products of combustion from the combustion chamber, and means for supplying air and fuel to said combustion chamber, the air supplying means comprising a conduit from the pressure side of said blower to the small end of said cone-shaped combustion chamber where said nozzles are located, and turning vanes for whirling the air from said conduit before it reaches the fuel in said combustion chamber.

5. In a dryer for grain and the like, a housing, a partition therein, a blower on one side of said partition and a combustion chamber on the other side thereof, said blower receiving the combustion gases from said combustion chamber and receiving air from around the combustion chamber, means for supplying air and fuel to said combustion chamber, the air supplying means comprising a conduit from the pressure side of said blower to said combustion chamber, and turning vanes for whirling the air before it enters the combustion chamber.

6. In a dryer, a housing, a partition therein, a blower on one side of said partition and a cone-shaped combustion chamber on the other side of said partition, means for supplying air and fuel to said combustion chamber, the air supplying means comprising a conduit from the pressure side of said blower to the small end of said cone-shaped combustion chamber where said nozzles are located, and turning vanes for whirling the air from said air supplying means.

7. In a portable dryer, a housing open at one end, a partition in said housing dividing it into a blower housing at the closed end and a blower intake housing at the open end, a blower in said blower housing, an outlet therefrom for supplying heater air, a combustion chamber projecting into said blower intake housing, said combustion chamber discharging its gases of combustion into said intake housing to mix with air entering said intake housing through said open end, said combustion chamber being supplied with combustion air from said blower housing and having an outer casing receiving such air before it enters the combustion chamber, said housing serving to preheat the air by receiving heat from said combustion chamber.

8. In a dryer of the character disclosed, a housing, a partition therein, a blower on one side of said partition and a cone-shaped combustion chamber on the other side of said partition, said blower receiving air from around said combustion chamber and receiving the products of combustion from the combustion chamber, and means for supplying air and fuel to said combustion chamber, the air supplying means comprising a conduit from the pressure side of said blower to the small end of said cone-shaped combustion chamber where said nozzles are located, a housing surrounding said combustion chamber to receive the air from said conduit and preheat the same by absorbing heat from said combustion chamber, and turning vanes within said housing for whirling the air before it reaches the fuel in said combustion chamber.

9. In a dryer of the character disclosed, a substantially circular housing having a discharge outlet at one side, a partition in said housing, a blower on one side of said partition and having its axis of rotation off center relative to the center of said housing for providing a passageway surrounding the blower which increases in cross section as said discharge outlet is approached, a cone-shaped combustion chamber on the other side of said partition, said blower receiving air from around said combustion chamber and receiving the products of combustion from the combustion chamber, and means for supplying air and fuel to said combustion chamber.

BOWEN CAMPBELL.

REFERENCES CITED

The following references are of record in the file of this patent:

UNITED STATES PATENTS

| Number | Name | Date |
| --- | --- | --- |
| Re. 22,482 | Schueder et al. | May 16, 1944 |
| 2,206,553 | Nagel | July 2, 1940 |
| 2,231,445 | Grapp | Feb. 11, 1941 |
| 2,285,718 | Isaacson | June 9, 1942 |
| 2,432,525 | Kruse | Dec. 16, 1947 |
| 2,444,588 | Bassinger et al. | July 6, 1948 |